F. R. WARREN.
LOCK FOR MOTOR VEHICLES.
APPLICATION FILED OCT. 27, 1919.
1,330,926.
Patented Feb. 17, 1920.
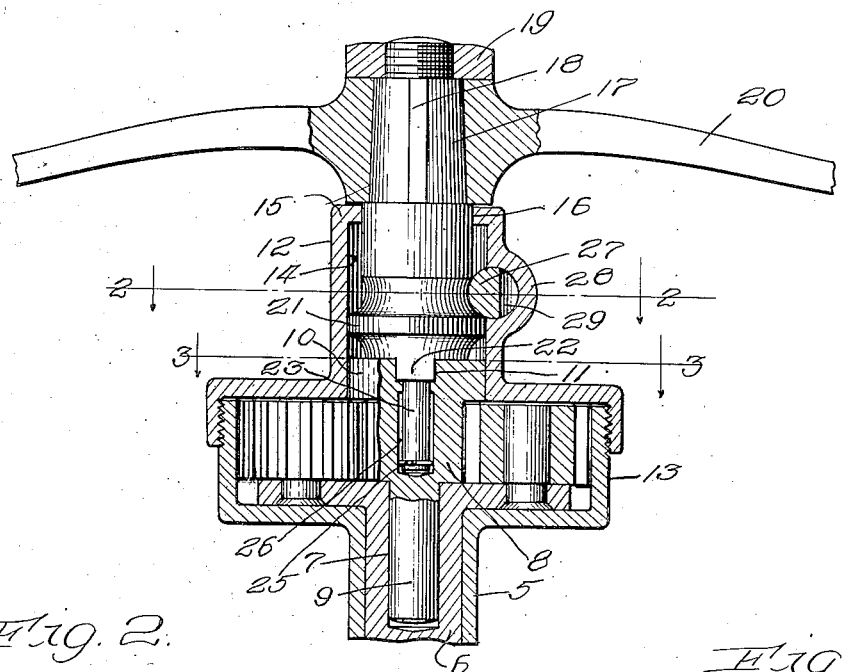
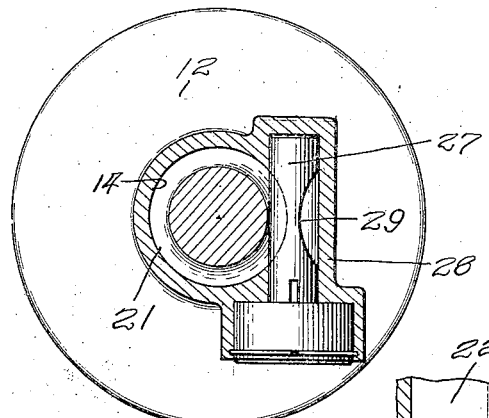
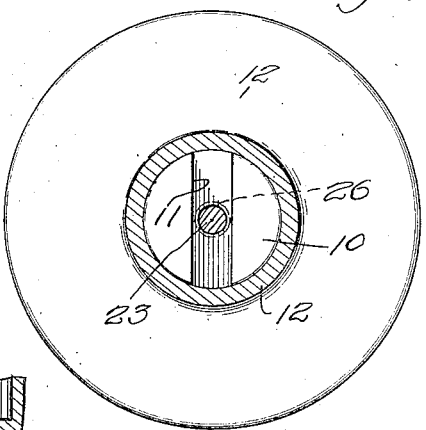
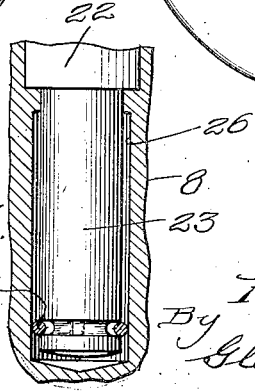
Witness:
R. L. Torrington
Inventor,
Frank R. Warren
By Glenn S. Noble, Atty.

UNITED STATES PATENT OFFICE.

FRANK R. WARREN, OF CHICAGO, ILLINOIS, ASSIGNOR TO SIMPLEX CORPORATION, OF CHICAGO, ILLINOIS.

LOCK FOR MOTOR-VEHICLES.

1,330,926.  Specification of Letters Patent.  Patented Feb. 17, 1920.

Application filed October 27, 1919. Serial No. 333,520.

*To all whom it may concern:*

Be it known that I, FRANK R. WARREN, a citizen of the United States, residing at Chicago, in the county of Cook and State of Illinois, have invented certain new and useful Improvements in Locks for Motor-Vehicles, of which the following is a specification.

This invention relates to means for locking automobiles or other similar vehicles so that they cannot be driven or operated. It is directed to means whereby the steering apparatus may be locked in either operative or inoperative position and is particularly directed to such apparatus in which planetary gears are used in the head of the steering column, although certain features thereof may be applicable to other steering apparatus.

The objects of this invention are to provide a new and improved lock which may be readily applied to various automobiles without the necessity of providing a new steering wheel; to provide a lock of exceedingly simple and durable construction; to provide a lock which may be applied to planetary gears without the necessity of moving any of the gears out of engagement with the other gears; and in general, to provide a lock having such novel features and advantages as will appear more fully from the following description.

In the accompanying drawings illustrating this invention:

Figure 1 is a longitudinal sectional view showing the lock as applied to a planetary gear steering device.

Fig. 2 is a cross section taken on the line 2—2 of Fig. 1;

Fig. 3 is a cross section taken on the line 3—3 of Fig. 1; and,

Fig. 4 is a detail showing the arrangement for uniting two of the parts.

As illustrated in these drawings, 5 indicates the ordinary steering column such for instance, as used on a Ford car, this column being provided with a rotatable shaft 6 for operating the steering devices. The upper end of the shaft has a hole 7 for receiving the stem of a stub shaft to which the ordinary steering wheel is attached. In the place of such stub shaft, which carries the usual center gear, I provide a gear 8 having a downwardly extending stem 9 which fits in the hole 7 and having an upwardly extending stem or portion 10 having a transverse central slot 11 therein. The ordinary cap is removed and in place thereof, I provide a cap 12 which is threaded to engage with the housing 13 and which has a central bore 14 of the same size as the extension 10. The cap 12 has an end 15 with a hole 16 therethrough for receiving a stub shaft 17. The upper end of this shaft is provided with splines 18 and a nut 19 for holding the steering wheel 20 in position. Such fastening arrangement is preferably made so as to fit the wheel of the particular make of car to which the device is to be applied. The lower portion of the shaft 17 is enlarged at 21 to fit within the cap 12 and the lower end has a projection 22 adapted to fit in the slot 11 so that the shaft 17 will have a turning engagement with the gear 8. The shaft 17 is also preferably provided with a stem 23 which extends down into a hole 24 in the gear member 8. This stem fits closely in the hole in order to form a guide for the shaft 17 and means are preferably provided for fastening these parts together for convenience in shipping and assembling. In the present instance, such means comprise a spring ring 25 which fits in a circumferential groove in the stem 23 and may be crowded into the groove when the stem is inserted in the hole, but will spring out into an enlargement 26 in the hole 24 when it reaches this position. The enlargement is made sufficiently long so that the stem may move longitudinally a sufficient distance to allow the projection 22 to be raised out of the slot 11.

The shaft 7 may be held in raised or lowered position by means of a locking bolt 27 which is mounted in the cap 12 and is manipulated by a lock 28. The bolt 27 has a cut away portion or recess 29 so that when it is turned in the proper direction, the enlarged portion 21 of the shaft 17 may move past the locking bolt. When the bolt is turned as shown in Fig. 1, the shaft 17 will be locked in engaging position or with the jaws interlocked so that when the steering wheel is turned, the vehicle will be guided. When it is desired to lock the wheel out of operative position, the shaft 17 is raised until the enlargement 21 passes above the locking bolt and the jaw 22 is out of engagement with the co-acting jaws of the part 10, When in position, the turning of the steering wheel will not operate the steering mechanism.

From this description, it will be seen that I provide a particularly simple and substantial locking device in which there are no small parts which are apt to be readily worn and the gears are not thrown into and out of engagement.

Having thus described my invention, which however, I do not wish to be limited to the exact construction herein shown and described except as specified in the following claims, what I claim and desire to secure by Letters Patent is:

1. The combination with an automobile steering mechanism having planetary gears at the top of the steering column, of a jaw member on one of said gears, a shaft having a jaw adapted to engage with said jaw member, a steering wheel on said shaft, a bearing for said shaft and means for locking said shaft with the jaws in operative or disengaged positions.

2. The combination with a steering post having planetary gears, of a projection on one of said gears with a transverse slot therein, a cap fitting over said projection and having a hole through its upper end, a stub shaft projecting through said hole and having an enlarged portion fitting in said cap, a steering wheel secured to said shaft, said shaft having a transverse lug for engagement with said slot, and locking means for engagement with the enlarged portion of the shaft for locking the shaft with the lug in engaged, or disengaged position.

3. The combination with a steering column having the usual housing at its upper end with planetary gearing for operating the steering post, of a central gear having an upwardly extending portion with a slot therein, a cap engaging with said housing and fitting over said upwardly extending portion, a shaft slidably mounted in said cap and having a projection for engaging with said slot, said shaft having a stem projecting into a hole in said gear, means for locking the stem in the hole while permitting a limited longitudinal movement, means for locking the shaft in raised or lowered position, and a steering wheel secured to said shaft.

4. In a locking device for automobiles, the combination with the steering wheel, of a longitudinally movable stub shaft having a jaw member at the lower end thereof, means for supporting said shaft, planetary gearing for operating the steering post, including a central gear having jaw members for engagement with the jaw member on said shaft, and means for holding the shaft with the jaws in engaging or disengaging position.

FRANK R. WARREN.